Patented Nov. 25, 1952

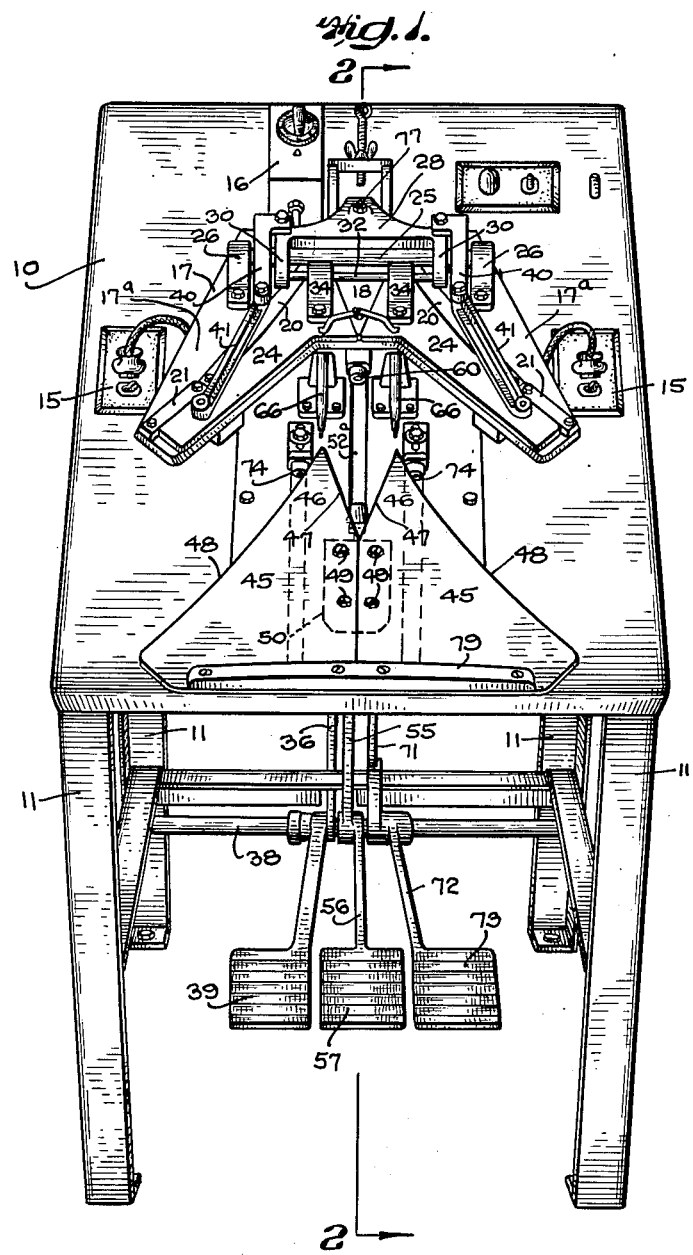

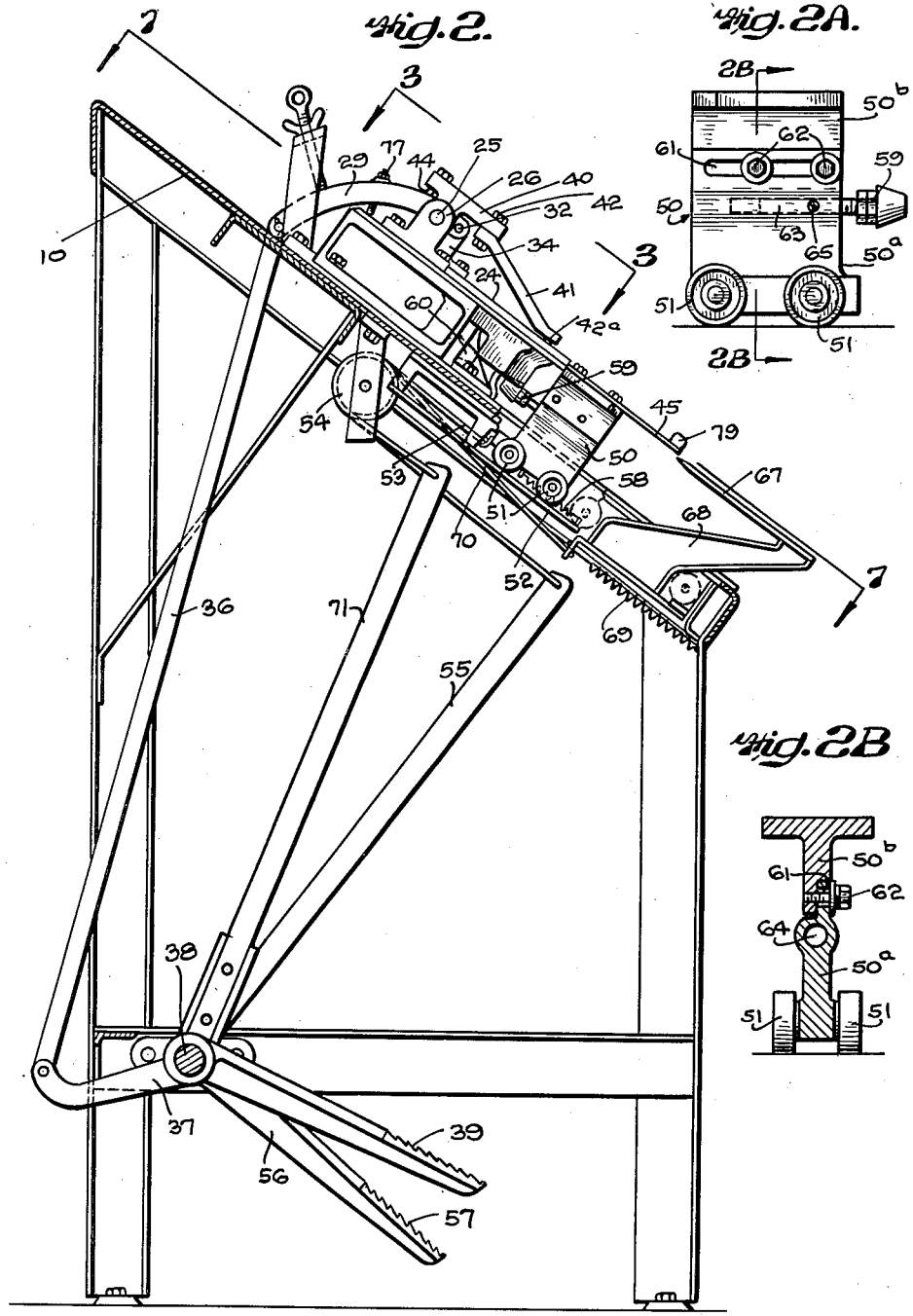

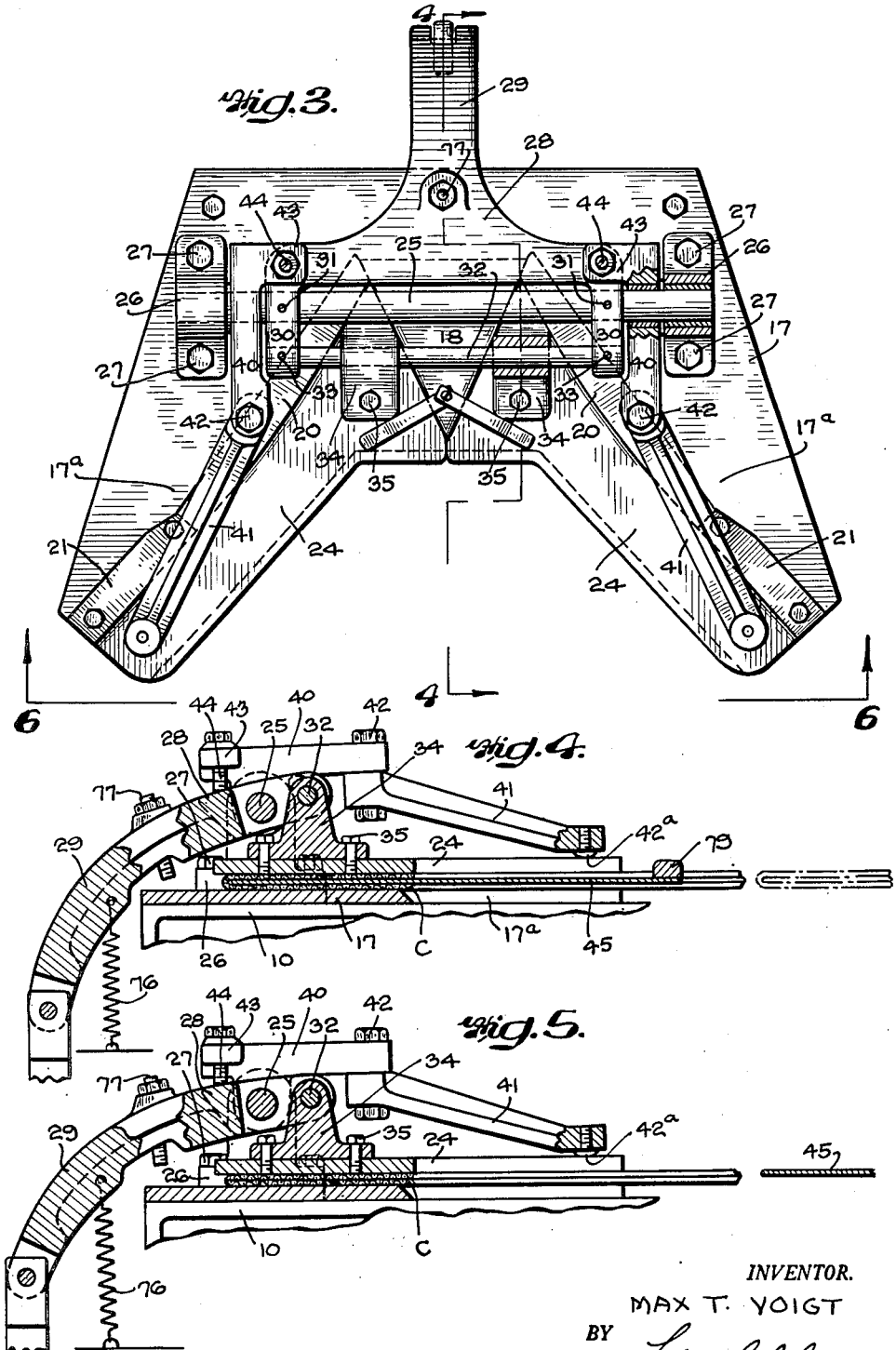

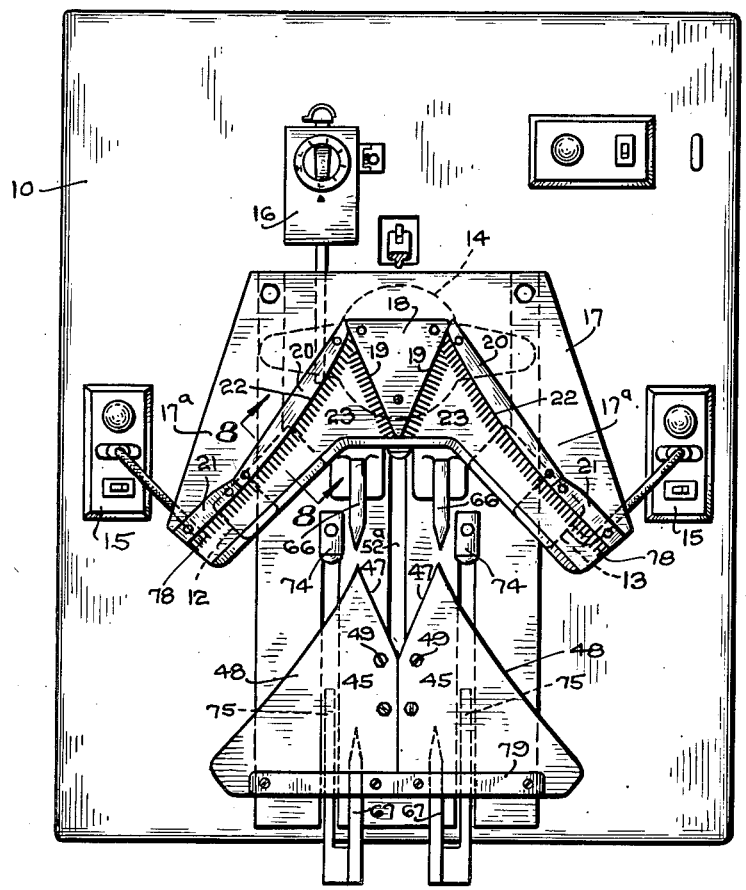

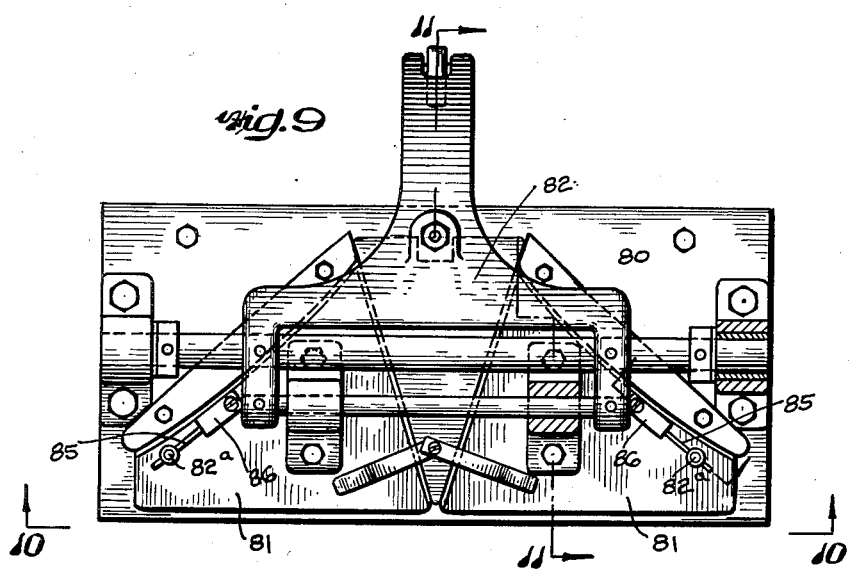
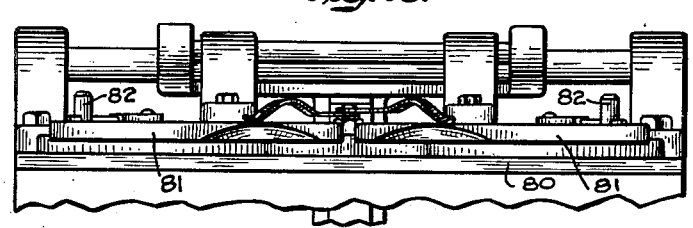
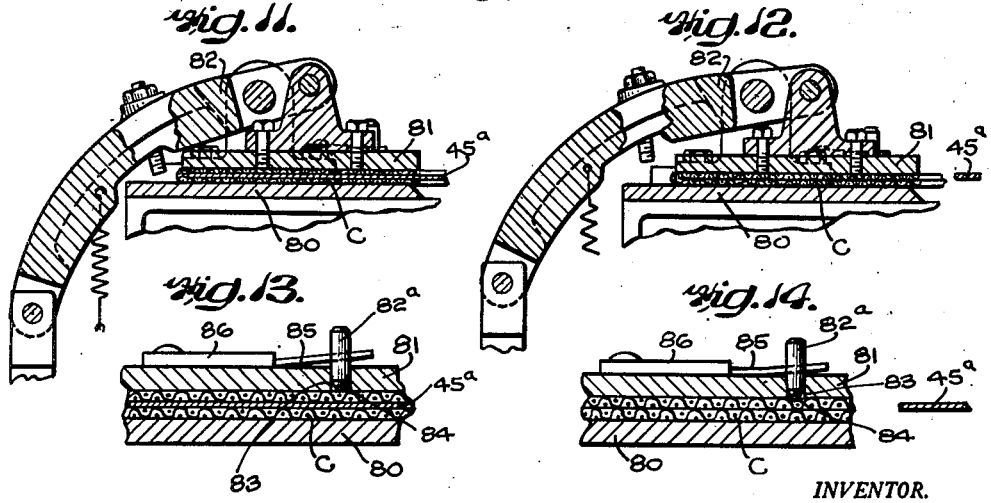
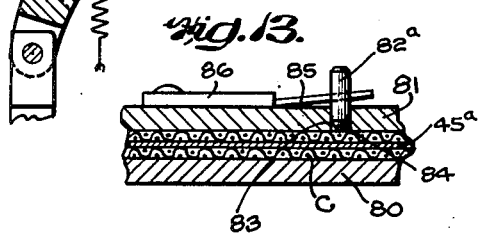
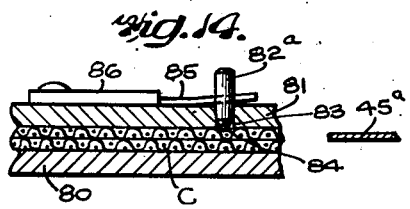

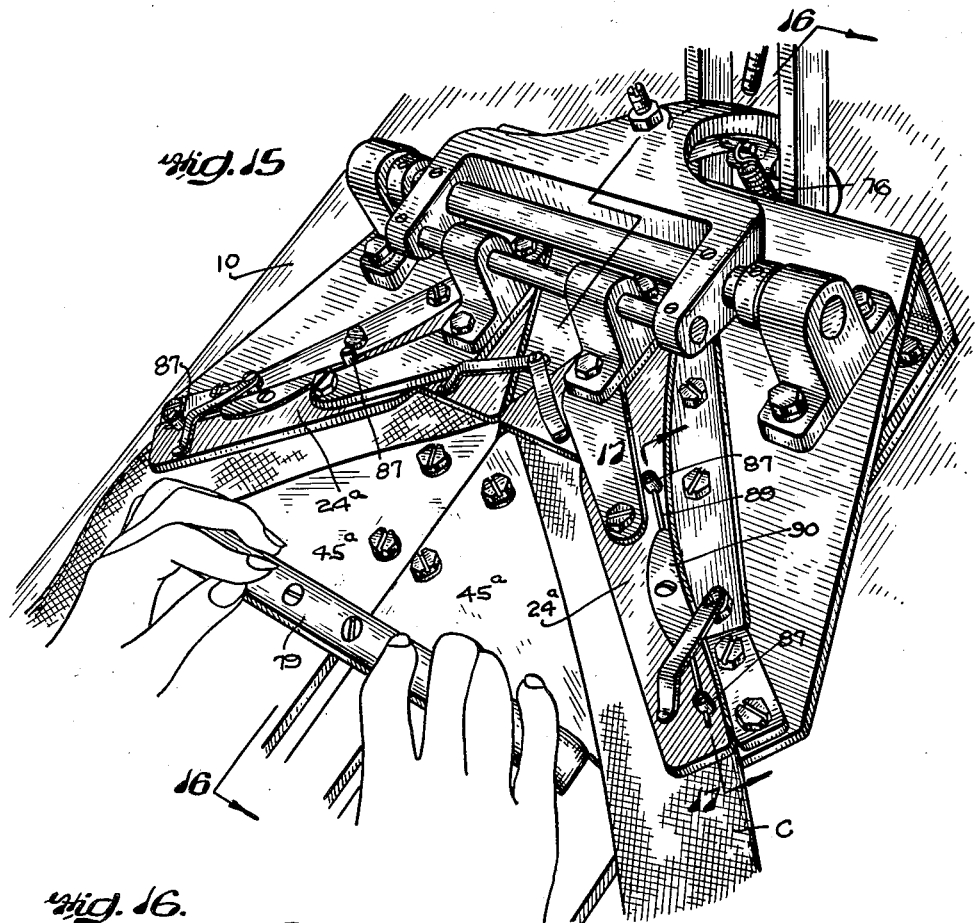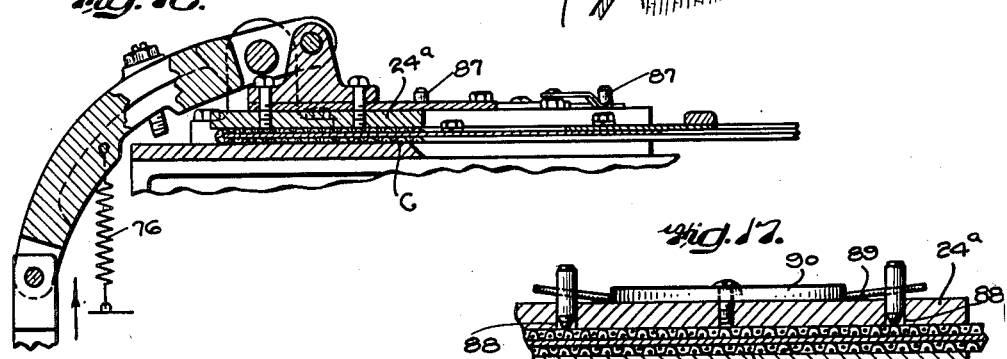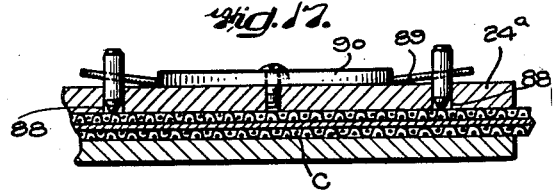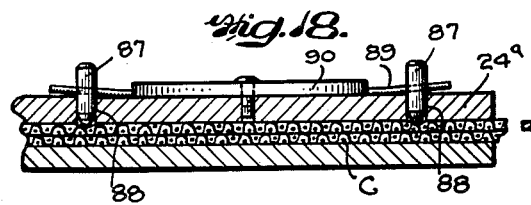

2,619,267

UNITED STATES PATENT OFFICE 2,619,267

COLLAR PRESSING APPARATUS

Max T. Voigt, Wyomissing, Pa., assignor to American Safety Table Co., Inc., Mohnton, Pa., a corporation of Pennsylvania Application June 9, 1950, Serial No. 167,203

13 Claims. (Cl. 223—2)

This invention relates generally to apparatus for shaping and pressing to form a portion of an article of wearing apparel manufactured of several plies of fabric and more particularly to improvements in apparatus for shaping and pressing collars, cuffs, lapels and other such garment parts of the type having a multiple-ply fold-over top portion, the edges of which are desired to be sharply defined.

As is well known in the art, multiple-ply collars, cuffs and like units are conventionally manufactured by initially sewing the several plies thereof together along all but their inner edges, following which the plied unit is turned right side out and pressed to shape to condition it for securement to the garment of which it is intended to form a part. In its initial condition, that is, prior to turning it right side out, the plied unit normally consists of a pair of facing plies and an interliner arranged in superimposed relation, the interliner being disposed externally of the facing plies and the latter being arranged with their normally exposed surfaces in flatwise engagement with one another. The three plies so relatively arranged as a unit are sewed together by a marginal line of stitching which extends along one longitudinal edge and the opposite transverse edges of the unit, the opposite points of the collar or the like being respectively formed between the longitudinal line of stitching and each transverse line thereof. The unit so initially formed is then turned right side out so as to dispose the interliner between the facing plies and to present to external view those surfaces of the latter which form the outer faces of the collar, cuff or the like.

The apparatus of the present invention is designed to facilitate the turning and shaping to final form of the multiple-ply unit of the type above described, it being among the principal objects of the invention to provide an apparatus which increases the speed of pressing such units to shape; which insures the production of such articles having uniformly trim and sharply defined edges; and which shapes and presses the article to eliminate wrinkles throughout the full body thereof.

A further object of the present invention is to provide a turning and shaping apparatus for collars, cuffs and the like wherein the means employed for turning the article preliminarily to shaping the same are adjustable for most efficient and convenient operation, wherein the die blades for insertion into the turned article preliminarily to the pressing operation are readily interchangeable so that the size and shape of the die blades may be changed to fit various sizes and shapes of articles to be shaped and pressed, and wherein means are provided for insuring a uniform distribution of shaping pressure over the full area of the article, especially along the sewed edge thereof, to obtain a uniformly smooth and neatly pressed product having sharply defined, uniformly shaped edges.

Still another object of the present invention is to provide in an apparatus of the character described a main table suitably fitted with thermostatically controlled electrical heating elements and adapted to operatively support interchangeable heat transmitting plates and shoes between which a multiple-ply unit of the character above mentioned is adapted to be pressed under heat and pressure.

A still further and important object of the present invention is to provide means operative to securely hold the collar or the like in pressing position beneath the pressing shoe during and following removal of the work-positioning die blade from the article, such means being operative upon release of the pressure upon the shoe sufficiently to permit retraction of the die blade from the article to prevent any slipping of the latter out of its proper pressing position.

Other objects and advantages of the present invention will appear more fully hereinafter, it being understood that the present invention consists substantially in the combination, construction, location and relative arrangement of parts, all as described in detail hereinafter, as shown in the accompanying drawings, and as finally pointed out in the appended claims.

In the accompanying drawings which are illustrative of certain preferred embodiments of the present invention:

Figure 1 is a front perspective view of a collar turning and shaping machine constructed in accordance with and embodying the principles of the present invention;

Figure 2 is a vertical sectional view as taken along the line 2—2 of Figure 1;

Figure 2A is a side elevational view of the die-blade supporting carriage;

Figure 2B is a sectional view as taken along the line 2B—2B of Figure 2A;

Figure 3 is a plan view of the collar pressing unit removed from its supporting table;

Figure 4 is a sectional view as taken along the line 4—4 of Figure 3, showing the collar supported in pressing position by the die plate;

Figure 5 is a view similar to Figure 4 but showing the die plate removed from the collar during the operation of pressing the latter;

Figure 6 is an end elevational view as taken from the line 6—6 of Figure 3;

Figure 7 is a top plan view of the apparatus showing the upper pressure shoes removed;

Figure 8 is a sectional view of a detail as taken along the line 8—8 of Figure 7;

Figure 9 is a plan view of a modified construction of the collar pressing removed from its supporting table;

Figure 10 is an end elevational view of the unit of Figure 9 as viewed from the line 10—10 of Figure 9;

Figure 11 is a sectional view as taken along the line 11—11 of Figure 9 showing the collar supported in pressing position by the die blade;

Figure 12 is a sectional view similar to Figure 11 but showing the die blade removed from the collar during the operation of pressing the latter;

Figures 13 and 14 are detail sectional views showing operation of the detent for holding the collar in pressing position during retraction of the collar-positioning die blade;

Figure 15 is a perspective view of a somewhat modified construction of the apparatus and wherein is illustrated the step of positioning the collar in pressing position;

Figure 16 is a sectional view as taken along the line 16—16 of Figure 15;

Figure 17 is a sectional view as taken along the line 17—17 of Figure 15;

Figure 18 is a sectional view similar to Figure 17 but showing the collar-positioning die blade retracted from the collar during pressing of the latter.

Referring now to the drawings and, first, more particularly to Figures 1 and 2 thereof, it will be observed that in the apparatus of the present invention the several operating mechanism thereof are suitably mounted on and supported by a floor-supported table having a forwardly and downwardly sloping top 10 suitably mounted upon a plurality of vertically extending legs 11, this table top being fitted with a pair of suitably located electrical heating units (not shown), these units being mounted upon the table top in the regions shown in dotted lines in Figure 7 and respectively designated 12, 13 and 14. Each of the units is individually supplied with operating current through independent thermostatically controlled units 15, 15 and 16. Inasmuch as the present invention is not primarily concerned with the design and construction of these heating units and their controls, further detailed description herein is not deemed necessary, it being simply pointed out that these heating units are designed to supply heat at a predetermined maximum temperature at conveniently located points on the table.

Suitably mounted upon the table top 10 in overlying relation to the several heating units is a metal base plate 17 of generally trapezoidal form having a relatively wide opening in its basal or frontage edge. Thus, this plate 17 may be described as being generally of U-shape having a pair of relatively divergent portions 17ª—17ª extending forwardly of the plate, that is, forwardly of the table top. Suitably secured to this plate 17 just above the zone of the heating unit 14 is a triangular block 18, the opposite edges of which form with the plate 17 sharply defined shoulders 19—19. Also suitably secured upon the plate 17 to either side of the block 18 are a pair of longitudinally extending members 20 and 21 which extend lengthwise along each divergent portion 17ª of the plate 17 to conjointly form with the latter a sharply defined shoulder 22, this shoulder 22 being longitudinally curved along a line forming an acute angle with that of the proximate shoulder 19. The depth of the central block 18 is equal to that of the members 20—21, in consequence of which there is formed upon either side of the central block 18 a pair of recesses 23—23 of generally triangular form and of uniform depth, each recess being bound upon only two of its sides by the shoulders 19 and 22 to provide a relatively wide entrance opening at the forward end of the plate 17.

It will be noted that the members 20—21 on one side of the plate 17 traverse the region of the heating unit 12, while the corresponding members on the opposite side of the plate 17 traverse the region of the heating unit 13, and consequently, the triangular recesses or pockets 23—23 are adapted to be heated throughout their full areas.

Superimposed upon the base plate 17 are a pair of pressing shoes 24—24, these shoes being respectively fitted snugly in the recesses 23—23 to overlie the full areas thereof and to exert a shaping pressure on the material which may be inserted into the recesses 23—23 beneath the shoes 24—24. As shown in Figures 1 to 6, inclusive, suitable means are provided for exerting pressure to both the inner and outer end regions of each shoe 24, with the degree of pressure applied to the outer end regions of said shoes being adjustable relatively to that applied to the inner end regions thereof.

This pressure applying means is best shown in Figures 3, 4 and 5, wherein it will be observed that the plate 17 is fitted with a transversely extending rocker shaft 25, the opposite ends of which are suitably journalled in end bearing blocks 26—26 suitably bolted to the plate 17, as by bolts 27—27. Suitably fixed upon the rocker shaft 25 is a yoke-member 28 having a rearwardly and downwardly curved arm 29 and a pair of laterally spaced forwardly extending short arms 30—30. The rocker shaft 25 extends transversely through the forwardly extending arms 30—30 and is nonrotatably fixed therein by the set screws 31—31. The forwardly extending arms 30—30 have their forward inner ends interconnected by a transversely extending rod 32 with the opposite ends of said rod nonrotatably fixed in its supporting arms 30—30 by the set screws 33—33.

Oscillatably mounted upon the transversely extending rod 32 are a pair of laterally spaced brackets 34—34, each of which latter is fixedly secured, as by the bolts 35—35, to the inner pointed end portion of a shoe 24. The rear end of the rearwardly extending arm 29 of the yoke 28 is connected by a link 36 to a foot pedal lever 37 suitably journalled upon a transversely extending shaft 38 mounted adjacent the bottom of the machine, this lever being provided at its forward free end with a foot-engaging pedal 39. It will be apparent from the foregoing that upon depressing the foot pedal 39, the link 36 will be shifted vertically upward to rotate the yoke 28 about the shaft 25 and so cause the cross rod 32 to be depressed, in consequence of which, pressure is applied to the inner pointed ends of the shoes 24—24 through the intervention of the brackets 34—34 oscillatably mounted on the cross rod 32.

Corresponding downward pressure upon the outer ends of the shoes 24—24 is effected by the auxiliary means now to be described and which are rendered effective by the yoke 28 simultaneously as the latter causes the pressure to be applied to the rear pointed ends of the shoes 24—24. Thus, referring to these figures, it will be observed that the shaft 25 is fitted adjacent opposite ends thereof with a pair of oscillatably mounted members 40—40, each of these members being provided with a forward extension thereof in the form of a member 41 bolted, as at 42, to the member 40. The forward end of the extension member 41 is provided with a knob 42ª for point contact with the outer end of the shoe 24, it being apparent that by loosening the bolt 42, the member 41 may be swung laterally with relation to its supporting member 41 to contact and exert pressure against the shoe 24 at any desired point in the end region thereof. The inner ends of the oscillatably mounted members 40—40 are respectively provided with lateral projections 43—43, the free end of each of which overlies the inner end of one of the arms 30—30 of the yoke 28. The extensions 43—43 of the members 40—40 are each provided with a vertically adjustable set screw 44, the lower end of which is engaged by the transverse body of the yoke 28 when the latter is swung upwardly about its pivotal axis, to wit, the axis of the shaft 25.

From the foregoing, it will be apparent that as the yoke 28 is shifted upwardly by actuation of the foot pedal 39 to exert pressure upon the rear pointed portions of the shoes 24—24, it will exert a corresponding pressure upon the inner ends of the members 40—40 to in turn cause the ends of the members 41—41 to engage and press down upon the corresponding ends of the shoes 24—24. Obviously, by axially adjusting the set screws 44—44, the timing as well as the degree of the pressure exerted by the members 41—41 upon the shoes 24—24 may be varied as desired. For example, it may be desirable to exert full pressure upon the rear pointed ends of the shoes 24—24 prior to exerting full pressure upon the forward ends of the shoes through the intervention of the members 41—41, which result is readily obtained by adjusting the set screws 44—44 to delay engagement thereof by the yoke 28 until after substantially full pressure has been exerted upon the inner ends of the shoes.

For positioning the pointed ends of the collars to be pressed within the triangular recesses 23—23 between the pad 17 and the shoes 24—24, the apparatus is provided with a pair of die blades 45—45 arranged in coplanar relation and shiftable in their plane for positionment in overlying relation to the recesses 23—23. As most clearly appears in Figure 1, these die blades are each provided with a pointed inner end 46 which is defined on one side by an edge 47 adapted to be brought into substantial registry with the shoulder 19 of the recess 23 and on the opposite side by a curved edge 48 adapted to be brought into registry with the edge 22 of the collar receiving recess 23. These die blades 45—45 are suitably secured, as by bolts 49, upon a movable carriage 50 (best shown in Figures 2, 2$^a$ and 2$^b$). This carriage 50 is supported upon a plurality of roller wheels 51 which are adapted to ride upon a suitable track 52 carried by the table top 10; the carriage being guided for rectilinear shifting movement lengthwise of the table by a longitudinal slot 52$^a$ formed in the table top 10. The carriage 50 is connected by a cable 53 passing around a suitable sheave 54 to the upper end of one arm 55 of a bell crank lever suitably journalled upon the shaft 38; the opposite arm 56 of said lever being provided at its free end with a foot pedal 57. A coiled tension spring 58 connects the carriage 50 with a fixed point, e. g. 51, on the apparatus, this spring being normally operative to return the carriage 50 and the die blades supported thereby to their rest position, as shown in Figure 1. It will be apparent that upon depressing the pedal 57, the wheeled carriage 50 will be drawn along its track against the restraining influence of the spring 58 into the position shown in Figure 2, in which position the die blades 45—45 will be located respectively within the triangular recesses 23—23 and between the plate 17 and its superimposed shoes 24—24.

The carriage 50 is provided at its inner end with a bumper block 59 adapted to abut against a fixed bumper 60 on the machine to limit the inward movement of the die blade assembly. For work on various differently shaped articles, it is necessary to employ properly designed pressing heads and die blades, and to insure proper positional relation between a given set of die blades and the fixed turning points (hereinafter described), the die blades are mounted as shown upon a carriage having relatively adjustable parts. To this end, the supporting carriage for the die blades is formed of two parts secured together in vertical relation, as shown in Figures 2$^a$ and 2$^b$, the lower part of 50$^a$ being provided with an elongated slot 61 therein through which projects a pair of securing bolts 62 threaded into the upper part 50$^b$ of the carriage. By loosening the bolts 62, the upper part 50$^b$ of the carriage may be shifted relatively to its lower part 50$^a$ and so vary position of the die blades relatively to the wheeled lower portion 50$^a$ of the carriage and to the relatively fixed turning points.

Thus, by relatively adjusting the parts 50$^a$ and 50$^b$ of the die blade supporting carriage, the die blades may be caused to seat in their respective recesses 23—23 with greater or less shifting movement of the carriage 50. Also, the extent of movement of the carriage from its normal, at-rest position to its innermost position may be varied as desired by axially adjusting the stop 59 relatively to the carriage, to which end the said stop 59 is preferably provided with an elongated threaded shank 63 which is axially shiftable in a threaded bore 64 suitably provided in the lower member 50$^a$ of the carriage; the shank being secured in its axially adjusted position by a set screw 65.

For turning the collar from its initial right-side-in sewed condition into its final right-side-out condition preliminarly to shaping and pressing the same, the apparatus includes two sets of paired turning points, each pair of which includes a relatively fixed forwardly projecting turning point 66 and a relatively shiftable turning point 67. These sets of paired turning points are best shown in Figures 1, 2 and 7, it being noted that the turning point 66 and 67 of each pair are in axial alinement and that the shiftable points 67—67 are adapted to be moved into point engaging position relatively to the fixed points 66—66, respectively. The shiftable points 67—67 are suitably supported upon a carriage 68 for rectilinear movement of these points along parallel lines axially coincident with the axes of the fixed points 66—66, the carriage 68 being normally held in its retracted position shown in Figure 2 by a coiled tension spring 69.

A cable 70 passing over the sheave 54 connects the inner end of the carriage 68 to the upper end of an arm 71 of a bell crank lever suitably journalled upon the shaft 38, the opposite arm 72 of this lever being provided at its free end with a foot actuating pedal 73. Upon depressing the pedal 73, the carriage 68 will be drawn inwardly against the restraint of the spring 69 and will present the pointed ends of the turning points 67—67 in contact with the similarly pointed ends of the fixed turning points 66—66. Suitable stops 74—74 may be provided to limit the travel of the movable turning points 67—67, these stops being positionally adjustable for respective engagement by two suitable stop elements 75—75 carried by the carriage 68. Referring to the yoke 28 for actuating the pressure shoes 24—24, it will be noted, as most clearly appears in Figures 4 and 5, that the arm 29 thereof is preferably connected to a suitably fixed point on the machine by a coiled tension spring 76, the function of this spring being to normally hold the yoke in position to relieve the shoes 24—24 of any pressure thereon.

In addition, the arm 29 of the yoke member 28 may be provided with an axially adjustable set screw 77, the inner end of which is adapted to bear against the back portion of the plate 17 to limit the spacing between the shoes 24—24 and the plate 17 when no pressure is exerted upon the pedal 39. The weight of the arm 29 and the link 36 connected to the pedal lever 37 plus the pull of the spring 76 upon the arm 29 is normally sufficient to maintain the shoes 24—24 raised above the base plate 17, the extent of this spacing being determined largely by the setting of the set screw 77.

For most efficient and rapid operation of the apparatus as hereinbefore described, the preferred practice would be to fit the left hand corner of a collar (while in its right-side-in state) upon the right hand stationary turning point 66, this point being thus received between the two facings of the collar. Then by actuation of the foot pedal 73, the shiftable turning points 67 are moved inwardly as to present the right hand one thereof in engagement with the point of the collar on the turning point 66 to hold the collar point in position during the next step of turning the collar right-side-out so as to embrace therein the outer right hand shiftable turning point 67 and at the same time fit it upon the right hand die blade. The operator now slips the shiftable turning point 67 entirely free of the collar by releasing the foot pedal controlling the turning points and then more accurately fits the point of the collar turned right-side-out upon the right hand die blade 45, making certain that the sewed edge or beading of the collar is in proper alinement and registry with the edge of the die blade.

This operation of fitting the collar turned right-side-out upon the die blade is performed while the die blade is in its outer or at rest position, and thereafter the foot pedal 57 is depressed to shift the die blade with its fitted collar thereon into the pressing recess 23. The foot pedal 39 is then actuated to lightly press the collar on the die blade between the base plate 17 and the shoe 24 overlying the collar, this pressure being then released sufficiently to permit the die blade to be withdrawn from the collar, but without disturbing the position of the collar between the plate 17 and the pressing shoe 24. Upon complete removal of the die blade from the collar, the pressure is reapplied to the shoe 24 by again pressing down upon the foot pedal 39, and this pressure is maintained until the collar is completely shaped and pressed under the heat and pressure applied by the coacting base plate and its overlying shoe. It will be understood, of course, that during all of the operation above described, the base plate 17 and the shoe 24 will have been heated by the underlying electrical heating units to a sufficient temperature. Having completed the pressing of the left-hand portion of the collar as just described, said portion is then removed from the pressing head and thereupon the same operations are performed upon the right-hand portion of the collar through use of the left-hand set of turning points, the left-hand die blade and the left-hand side of the pressing head. To effect these operations upon the right-hand portion of the collar, it is merely necessary to shift the collar laterally across the front of the machine to present the unpressed right hand portion thereof (which is still in its right-side-in condition) in position to register with the left-hand stationary turning point 66, following which the collar is first turned right-side-out, is then fitted upon the left-hand die blade, shifted by the latter into pressing position and is then finally pressed to shape by the pressing shoe.

While the collar above-mentioned remains subject to heat and pressure under the left hand shoe, the left hand corner of a second inside-out collar is placed upon the right hand stationary turning point 66, following which this second collar is turned right-side-out and then fitted over the right hand die plate 45 for subsequent insertion into the recess 23 for the pressing operation as above described.

It will be understood, of course, that the foregoing cycle of operations is continued for an entire series of collars to be shaped and pressed, the opposite wing portions of each collar being successively pressed in the two pressing zones of the machine. It will be understood, also, that the portion of the collar to be pressed is so positioned by its supporting die plate 45 within the heated recess 23 as to present the sewed or beaded edges of the collar snugly against the shouldered edges 19 and 22 of the collar-receiving recess, in consequence of which, upon withdrawal of the die plate from the collar and the application of pressure to the overlying shoe 24, the entire portion of the collar disposed within each of the recesses 23 is pressed to provide it with smooth, unwrinkled facings and with a trim, neatly shaped point having sharply defined edges or beadings of predetermined outline.

In order to maintain the collar portion in proper pressing position within the shouldered recess 23, the latter may be provided above its marginal edges with lightly serrated or knurled surfaces 78 (see Figure 7) which frictionally grip the fabric of the collar upon application of light pressure thereto by the overlying pressing shoe 24 and so retain it against displacement from beneath the shoe upon withdrawal of the die blade 45 from the collar.

The apparatus shown in Figures 1 to 8, inclusive, is designed for the pressing and shaping of an entire collar, it being noted in this connection that the recesses 23—23 and their overlying shoes 24—24 are respectively each of a size and shape to take a full half portion of the collar. Also, it will be noted that full pressure is applied over the entire surface of each elongated shoe 24 by the inner pressure bracket 34 and by the auxiliary jointed pressure arm 40—41, the latter being adjustable laterally to vary as desired the point at which pressure is applied to the outer end of the shoe and being further subject to variable pressure to equalize the pressures exerted upon the inner and outer regions of the collar portion undergoing shaping and pressing.

The die blades 45—45 may be provided, if desired, with a hand pusher bar 79 by means of which the die blades may be manually shifted into and out of registry with the recesses 23—23.

Figures 9 to 14, inclusive, illustrate a modified construction of an apparatus designed particularly for the shaping and pressing of the pointed wing portions only of a collar. In this modified construction a base plate 80 of generally rectangular form is employed in lieu of the corresponding member 17 of the apparatus shown in Figures 1 to 8, this base plate being suitably mounted, as in the first instance, upon the table top 10 in overlying relation with respect to a suitable heating unit. The shoes 81—81 are necessarily smaller than in the first described form of the apparatus, and are respectively of a size and shape adapted to register with generally triangularly shaped recesses in which are received the pointed ends of the collars. Operating pressure is applied to these shoes 81—81 by a yoke member 82 and associated parts which are similar in all material respects to the yoke member 28 and its associated parts previously described, excepting that the yoke member 82 is not provided with any auxiliary pressure equalizing arms like those designated 40—41 in Figures 1 to 7.

In order to prevent slipping of the collar point from beneath the presure shoe 81 when the die plate 45ª is retracted, each of the shoes 81—81 is provided with a spring pressed detent in the form of a pin 82ª projecting axially through an opening 83 suitably provided in the shoe. As most clearly appears in Figures 13 and 14, the lower end of this pin is rounded or pointed, as at 84, to engage the collar fabric when it is positioned beneath the pressure shoe 81, the pointed end of the detent pin being maintained in light frictional engagement with the collar fabric under the bias of a spring wire 85 projecting transversely through the pin, the spring wire being secured to the shoe 81 by a suitably fixed clamp or block 86 or otherwise. Except as indicated, the shaping and pressing form of Figures 9 to 14 is in all material respects similar to that previously described.

Figures 15 to 17, inclusive, show a form of the apparatus which is quite similar to that of Figures 1 to 8, inclusive, the only substantial difference between them being in the means employed for frictionally retaining the collar in position beneath the pressing shoe 24ª during the following removal of the die plate 45ª. In this modified form of the apparatus, the collar is retained against slipping from beneath the pressure shoe by a pair of spring-pressed detents 87—87, each in the form of a pointed pin projecting axially through an opening 88 provided in the pressure shoe 24ª. Each pair of the detent pins associated with a particular shoe is normally biased into light frictional engagement with the collar fabric by a single spring wire 89 extending longitudinally of each shoe and secured to the latter by a clamping plate 90, the opposite ends of the wire extending freely of the clamping plate for projection transversely through the detent pins 87—87.

Wherever shown in the drawings, the collar undergoing shaping and pressing is designated by the reference letter C, it being understood that the apparatus is not limited in its use to the pressing and shaping of collars alone, but instead is adapted to press to predetermined shape other articles adapted to be incorporated in garments, such as cuffs, lapels, patch pockets and the like, the shape and configuration of which determine the shape and setting of the pressing head and die blades employed in the apparatus. It will be understood, also, that the present invention is susceptible of various changes and modifications which may be made from time to time without departing from the general principles or real spirit of the invention, and it is accordingly intended to claim the same broadly as well as specifically as indicated by the appended claims.

What is claimed as new and useful is:

1. In a shaping apparatus of the character described, an electrically heated base plate having an article-receiving recess formed therein, said recess having a pressing face and edge-defining shoulders rising substantially normal to said pressing face and extending perimetrally about the opposite sides and rear of said recess and being interrupted at the frontal edge thereof to provide an entrance for planar projection into said recess of an article to be shaped, a rectilinearly shiftable die blade operative to receive said article thereon and shift the same into said recess with the marginal edges of said article abutting said edge-defining shoulders of the recess, said die blade being retractable from the article when the latter is positioned in said recess, a pressure shoe overlying said recess and having a coacting pressing face with perimetral edges adapted to fit snugly within the shouldered edges of said recess, means for applying pressure to said shoe to press the article positioned in said recess flatwise between the coacting pressing faces aforesaid, and means in at least one of said pressing faces operative to frictionally hold said article in position within said recess and beneath said shoe upon release of the shoe pressure upon and retraction of said die blade from said article positioned in the recess.

2. In a shaping apparatus of the character described, an electrically heated base plate having an article-receiving recess formed therein, said recess having a pressing face and edge-defining shoulders rising substantially normal to said pressing face and extending perimetrally about the opposite sides and rear of said recess and being interrupted at the frontal edge thereof to provide an entrance for planar projection into said recess of an article to be shaped, a rectilinearly shiftable die blade operative to receive said article thereon and shift the same into said recess with the marginal edges of said article abutting said edge-defining shoulders of the recess, said die blade being retractable from the article when the latter is positioned in said recess, a pressure shoe overlying said recess and having a coacting pressing face with perimetral edges adapted to fit snugly within the shouldered edges of said recess, means for applying pressure to said shoe to press the article positioned in said recess flatwise between the coacting pressing faces aforesaid, and means in at least one of said pressing faces operative to frictionally hold said article in position within said recess and beneath said shoe upon release of the shoe pressure upon and retraction of said die blade from said article positioned in the recess, said last-mentioned means consisting of serrations extending marginally about the pressing face in which they are included.

3. In a shaping apparatus of the character described, an electrically heated base plate having an article-receiving recess formed therein, said recess having edge-defining shoulders rising substantially normal to the plane of said base plate and extending perimetrally about the opposite sides and rear of said recess and being interrupted at the frontal edge thereof to provide an entrance for planar projection into said recess of an article to be shaped, a rectilinearly shiftable die blade operative to receive said article thereon and shift the same into said recess with the marginal edges of said article abutting said edge-defining shoulders of the recess, said die blade being retractable from the article when the latter is positioned in said recess, a pressure shoe overlying said recess and having perimetral edges adapted to fit snugly within the shouldered edges of said recess, means for applying pressure to said shoe to press the same flatwise against the article positioned in said recess, and means operative to frictionally hold said article in position within said recess and beneath said shoe upon retraction of said die blade from said article positioned in the recess, said last-mentioned means including a spring-pressed detent axially projecting through said shoe for engagement with the article positioned in said recess.

4. In a shaping apparatus of the character described, an electrically heated base plate having an article-receiving recess formed therein, said recess having edge-defining shoulders rising substantially normal to the plane of said base plate and extending perimetrally about the opposite sides and rear of said recess and being interrupted at the frontal edge thereof to provide an entrance for planar projection into said recess of an article to be shaped, a rectilinearly shiftable die blade operative to receive said article thereon and shift the same into said recess with the marginal edges of said article abutting said edge-defining shoulders of the recess, said die blade being retractable from the article when the latter is positioned in said recess, a pressure shoe overlying said recess and having perimetral edges adapted to fit snugly within the shouldered edges of said recess, means for applying pressure to said shoe to press the same flatwise against the article positioned in said recess, and means operative to frictionally hold said article in position within said recess and beneath said shoe upon retraction of said die blade from said article positioned in the recess, said last-mentioned means including a pair of spring-pressed pins spaced along one edge of said shoe and projecting axially therethrough for engagement with the article positioned in said recess.

5. In a shaping apparatus of the character defined in claim 3 wherein said spring-pressed detent is in the form of a pointed pin which is normally biased into holding engagement with the article.

6. In a shaping apparatus of the character described an electrically heated base plate having formed therein a pair of laterally spaced article-receiving recesses, each of said recesses being open at their frontal ends for planar projection thereinto of an article to be pressed and being marginally enclosed along the opposite side and rear ends thereof by edge-defining shoulders rising substantially normal to the plane of said base plate, means for positioning an article to be pressed into each of said recesses with the marginal edges of the article in registry with and abutting the shouldered edges of the recess, a pair of pressure shoes respectively adapted for snug registry with said recesses, and means for applying localized pressure to the fore and aft end portions of each of said shoes, said last-mentioned means including an oscillatably mounted yoke mounted rearwardly of the open frontal ends of said recesses and having a pair of laterally spaced members respectively operative to exert pressure upon the rear portions of said shoes and a pair of auxiliary pressure-applying arms respectively extending to the front portions of said shoes for there exerting pressure upon the latter.

7. In a shaping apparatus of the character described an electrically heated base plate having formed therein a pair of laterally spaced article-receiving recesses, each of said recesses being open at their frontal ends for planar projection thereinto of an article to be pressed and being marginally enclosed along the opposite side and rear ends thereof by edge-defining shoulders rising substantially normal to the plane of said base plate, means for positioning an article to be pressed into each of said recesses with the marginal edges of the article in registry with and abutting the shouldered edges of the recess, a pair of pressure shoes respectively adapted for snug registry with said recesses, means for applying localized pressure to the fore and aft end portions of each of said shoes, said last-mentioned means including an oscillatably mounted yoke mounted rearwardly of the open frontal ends of said recesses and having a pair of laterally spaced members respectively operative to exert pressure upon the rear portions of said shoes and a pair of oscillatably mounted forwardly extending, laterally spaced pressure arms respectively terminating above the forward end portions of said shoes, and means for adjusting the pressure-applying position of the terminal ends of said arms relatively to said shoes.

8. In a shaping apparatus of the character described, an electrically heated base plate having formed therein a pair of laterally spaced article-receiving recesses, each of said recesses being open at their frontal ends for planar projection thereinto of an article to be pressed and being marginally enclosed along the opposite side and rear ends thereof by edge-defining shoulders rising substantially normal to the plane of said base plate, means for positioning an article to be pressed into each of said recesses with the marginal edges of the article in registry with and abutting the shouldered edges of the recess, a pair of pressure shoes respectively adapted for snug registry with said recesses, means for applying localized pressure to the fore and aft end portions of each of said shoes, said last-mentioned means including an oscillatably mounted yoke mounted rearwardly of the open frontal ends of said recesses and having a pair of laterally spaced members respectively operative to exert pressure upon the rear portions of said shoes and a pair of oscillatably mounted forwardly extending, laterally spaced pressure arms respectively terminating above the forward end portions of said shoes, and means for varying the operating relationship between said yoke and said arms to variably adjust the pressure exerted by the latter upon said shoes.

9. In a shaping apparatus of the character described, an electrically heated base plate having formed therein a pair of laterally spaced article-receiving recesses, a pair of pressure shoes respectively adapted for snug registry with said recesses, means for applying pressure to said shoes to press the same flatwise against the articles positioned in said recesses, a pair of die blades respectively adapted to receive thereon the articles to be shaped, said die-blades being rectilinearly shiftable in the plane thereof to position the articles in said recesses and beneath said pressure shoes, a pair of laterally spaced stationary turning points operatively associated with said base plate, a pair of rectilinearly shiftable turning points respectively in axial alinement with said stationary turning points and adapted to be brought into point-to-point contact with the latter, and a shiftable carriage for said die-blades, said carriage having a pair of parts relatively adjustable along the line of travel of the carriage, one of which parts supports said die-blades in adjusted relation with respect to the other part.

10. In a shaping apparatus of the character described, an electrically heated base plate having an article-receiving recess formed therein, said recess having a pressing face and edge-defining shoulders rising substantially normal to said pressing face and extending perimetrally about the opposite sides and rear of said recess and being interrupted at the frontal edge thereof to provide an entrance for planar projection into said recess of an article to be shaped, a rectilinearly shiftable die blade operative to receive said article thereon and shift the same into said recess with the marginal edges of said article abutting said edge-defining shoulders of the recess, said die blade being retractable from the article when the latter is positioned in said recess, a pressure shoe overlying said recess and having a coacting pressing face with perimetral edges adapted to fit snugly within the shouldered edges of said recess, means for applying pressure to said shoe to press the article positioned in said recess flatwise between the coacting pressing faces aforesaid, and means in at least one of said pressing faces operative to frictionally hold said article in position within said recess and beneath said shoe upon release of the shoe pressure upon and retraction of said die blade from said article positioned in the recess, said last-mentioned means including a spring-pressed detent normally biased to engage the article positioned in said recess.

11. In a shaping apparatus of the character described an electrically heated base plate having formed therein a pair of laterally spaced article-receiving recesses, each of said recesses being open at their frontal ends for planar projection thereinto of an article to be pressed and being marginally enclosed along the opposite side and rear ends thereof by edge-defining shoulders rising substantially normal to the plane of said base plate, means for positioning an article to be pressed into each of said recesses with the marginal edges of the article in registry with and abutting the shouldered edges of the recess, a pair of pressure shoes respectively adapted for snug registry with said recesses, and means for applying localized pressure to the fore and aft end portions of each of said shoes, said last-mentioned means including an oscillatably mounted yoke mounted rearwardly of the open frontal ends of said recesses and having a pair of laterally spaced members respectively operative to exert pressure upon the rear portions of said shoes and a pair of oscillatably mounted auxiliary pressure-applying arms respectively extending to the front portions of said shoes for there exerting pressure upon the latter, said auxiliary arms being oscillatable about the oscillating axis of said yoke and having elements extending rearwardly of said axis into positions overlying said yoke for engagement by the latter upon movement thereof into pressure-exerting position.

12. In a shaping apparatus of the character described an electrically heated base plate having formed therein a pair of laterally spaced article-receiving recesses, each of said recesses being open at their frontal ends for planar projection thereinto of an article to be pressed and being marginally enclosed along the opposite side and rear ends thereof by edge-defining shoulders rising substantially normal to the plane of said base plate, means for positioning an article to be pressed into each of said recesses with the marginal edges of the article in registry with and abutting the shouldered edges of the recess, a pair of pressure shoes respectively adapted for snug registry with said recesses, means for applying localized pressure to the fore and aft end portions of each of said shoes, said last-mentioned means including an oscillatably mounted yoke mounted rearwardly of the open frontal ends of said recesses and having a pair of laterally spaced members respectively operative to exert pressure upon the rear portions of said shoes and a pair of oscillatably mounted auxiliary pressure-applying arms respectively extending to the front portions of said shoes for there exerting pressure upon the latter, said auxiliary arms being oscillatable about the oscillating axis of said yoke and being shiftable by the latter into pressure-exerting position, and means intervening said auxiliary arms and said yoke for adjusting the effective angular relationship of said arms relatively to said yoke to thereby correspondingly vary the degree and timing of the pressure exerted by the said auxiliary arms.

13. In a shaping apparatus of the character described an electrically heated base plate having formed therein a pair of laterally spaced article-receiving recesses, each of said recesses being open at their frontal ends for planar projection thereinto of an article to be pressed and being marginally enclosed along the opposite side and rear ends thereof by edge-defining shoulders rising substantially normal to the plane of said base plate, means for positioning an article to be pressed into each of said recesses with the marginal edges of the article in registry with and abutting the shouldered edges of the recess, a pair of pressure shoes respectively adapted for snug registry with said recesses, means for applying localized pressure to the fore and aft end portions of each of said shoes, said last-mentioned means including an oscillatably mounted yoke mounted rearwardly of the open frontal ends of said recesses and having a pair of laterally spaced members respectively operative to exert pressure upon the rear portions of said shoes and a pair of oscillatably mounted auxiliary pressure-applying arms respectively extending to the front portions of said shoes for there exerting pressure upon the latter, said auxiliary arms each including a rear part mounted for oscillation about the oscillating axis of the yoke and a frontal extension which is swingable relatively to said rear part to present its forward end in laterally adjusted position immediately above the front end of its associated pressure shoe.

MAX T. VOIGT.

REFERENCES CITED

The following references are of record in the file of this patent:

UNITED STATES PATENTS

| Number | Name | Date |
|---|---|---|
| 1,902,330 | Kaplan | Mar. 21, 1933 |
| 2,090,318 | Voigt | Aug. 17, 1937 |
| 2,226,143 | Self | Dec. 24, 1940 |